3,496,238
Patented Feb. 17, 1970

3,496,238
METHOD OF PREPARING LOW MOLECULAR WEIGHT ISOTACTIC POLYPROPYLENE GLYCOLS AND CATALYST SYSTEM THEREFOR
Gunther Elfers, Grosse Ile, Mich., assignor to Wyandotte Chemicals Corporation, Wyandotte, Mich., a corporation of Michigan
No Drawing. Filed Nov. 20, 1967, Ser. No. 684,478
Int. Cl. C07c 41/02, 43/02
U.S. Cl. 260—615         5 Claims

ABSTRACT OF THE DISCLOSURE

Isotactic polypropylene glycols are prepared from commercially available d,l-mixtures of propylene oxide by polymerizing such mixtures, using an aluminum triisopropoxide acetate-water catalyst system and saponifying the resulting hydroxylester-terminated polymer.

---

The present invention relates to polypropylene glycols. It is more particularly concerned with isotactic polypropylene glycols of low molecular weight. In another aspect, the invention is concerned with a process for the preparation of isotactic polypropylene glycols.

Isotactic diols are of great interest in the production of polyurethanes which have advantageous properties, such as a high tensile strength at break, a high elongation at break, and improved adhesive properties. Low molecular weight, isotactic polypropylene glycols have heretofore been made only from l-propylene oxide using potassium hydroxide as the catalyst. However, the difficulties in preparing l-propylene oxide have made the commercial utilization of this method impractical and uneconomical.

In the Journal of the American Chemical Society, vol. 78, 4787–4792 (1956), Price and Osgan disclose the polymerization of l-propylene oxide to prepare an isotactic polymer. In the procedure described therein, it is necessary to go through a series of complicated procedures to obtain l-propylene oxide from the d,l-mixture of propylene oxide.

It is an object of this invention to provide novel isotactic polypropylene glycols of sufficiently low molecular weight to be suitable for use in the preparation of useful polymers such as polyurethanes. It is a further object to provide a method for the preparation of the low molecular weight isotactic polypropylene glycols. It is another object to provide a method for the preparation of low molecular isotactic polypropylene glycols from commercially available d,l-mixture of propylene oxide. It is an additional object to provide a novel catalyst system for use in the preparation of low molecular weight isotactic polypropylene glycols.

Other and further objects and advantages of the invention will become apparent to those skilled in the art upon consideration of the following disclosure:

Commercially available propylene oxide is a racemic monomer; that is, it is a monomer that does not rotate the plane of polarized light. The racemic monomer is optically inactive because it is a mixture of equal quantities of the dextro (d) and levorotatory (l) isomers of propylene oxide. Prior to the present invention, it appears that the polymerization of the racemic mixture of propylene oxide to prepare low molecular weight isotactic polymers thereof was unknown.

According to the present invention, a low molecular weight isotactic polypropylene glycol is prepared by polymerizing a commercially available d,l-mixture of propylene oxide, preferably in a hydrocarbon medium, in the presence of an aluminum triisopropoxide acetate-water catalyst system, adding water to the resulting reaction mixture containing polymer, thereby precipitating aluminum hydroxide, separating the aluminum hydroxide from the reaction mixture, and then saponifying the polymer to obtain isotactic polypropylene glycol.

The polymerization is performed with a selected catalyst that does not terminate or initiate the polymer chain propagation with an end group other than hydroxyl or such end groups that can be readily converted to hydroxyl groups, e.g., an ester group. The catalyst consists essentially of the reaction product of aluminum triisopropoxide acetate and water. The aluminum triisopropoxide acetate can be readily prepared by reacting about 1 mole of aluminum triisobutyl dissolved in a hydrocarbon solvent with about 3 to 4 moles of propylene glycol monoacetate. The catalyst system of this invention can be preformed by mixing the aluminum triisopropoxide acetate and water or it can be formed in situ in the presence of the propylene oxide monomer. In the case of the latter procedure, the aluminum triisobutyl dissolved in a hydrocarbon solvent, the propylene glycol monoacetate and the water are added separately to the reaction while introducing propylene oxide. As an alternate procedure, the propylene glycol monoacetate, water, and propylene oxide can be added as a mixture while charging the solution of aluminum triisobutyl separately. The aluminum compound and the monoacetate are generally in a hydrocarbon solvent when reacted to prepare the aluminum triisopropoxide acetate or when added during the in situ preparation of the catalyst. Any inert hydrocarbon solvent can be utilized in the above described procedures. The amount of solvent used is that which is sufficient to provide a suitable reaction medium and is generally on a molar basis in excess of the total amount of the reactants. Examples of suitable solvents include aliphatic hydrocarbons, such as hexane, heptane, isoheptane, aromatic hydrocarbons, such as benzene, toluene, xylene, chlorinated hydrocarbons, such as carbon tetrachloride, ethylene dichloride, propylene dichloride, and oxygenated hydrocarbons, such as, diethyl ether, dimethyl ether and anisole, and the like.

The molar ratio of aluminum triisobutyl to propylene glycol monoacetate used when the catalyst is preformed prior to contact with the monomer is about 1:3–4. The resulting aluminum triisoproproxide acetate catalyst component is then mixed with water to form the catalyst which is then contacted with the propylene oxide. It is also within the purview of the invention to add the aluminum triisopropoxide acetate to a mixture of propylene oxide and water. The molar ratio of the aluminum triisopropoxide acetate to water is about 1 to 0.5 to 1.5 while the mole ratio of aluminum triisopropoxide acetate to propylene oxide is about 1:5 to 100. When the catalyst system is prepared in situ during the polymerization process, the molar ratio of aluminum triisobutyl to propylene glycol monoacetate to water to propylene oxide is about 1:3 to 4:0.5 to 1.5:5 to 100.

The polymerization product obtained is terminated partly with acetic ester groups and partly with hydroxyl groups after the separation of the aluminum by hydrolysis. Thereafter, the ester groups are saponified to yield a completely hydroxyl-terminated isotactic polymer.

In a preferred embodiment, the polymerization is performed in a reactor equipped with a reflux condenser and stirrer at temperatures in the range from about 50° to 80° C. The pressure under which the reaction is conducted is about atmospheric to 20 or more atmospheres. The d,l-mixture of propylene oxide is added to the catalyst system in the reactor at a rate such that the polymerization requires from about 12 to 55 hours. After completion of the polymerization, excess water is added in order to precipitate the aluminum out of the solution in the form of aluminum hydroxide. The polymer is separated from the solution by extraction of the resulting slurry in a continuous extractor with an inert hydrocarbon solvent such as those mentioned before. After the hydroxyl-ester-terminated polymer is isolated, it is saponified with an excess of an alcoholic solution of an alkali metal hydroxide, neutralized with dilute hydrochloric acid, and extracted with a hydrocarbon solvent in a continuous extractor to yield a colorless, viscous liquid. Examples of suitable alcohols for dissolution of the alkali metal hydroxide are methanol, ethanol, propanol and the like. The temperature at which the saponification reaction is carried out is about 50° C. to 80° C. with the pressure ranging from about atmospheric to 20 of more atmospheres. After standing at room temperature for a few hours, this liquid product crystallizes to a white semi-solid wax.

The following is a schematic representation of the reaction mechanism:

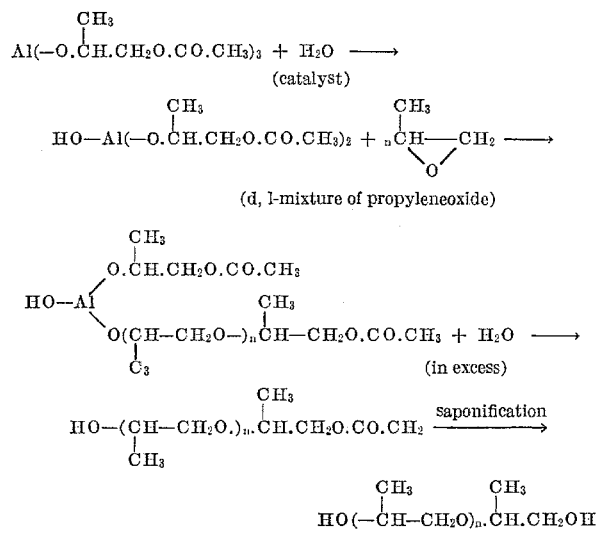

It is to be understood that the proposed reaction mechanism is presented here for illustrative purposes only and that it is not intended to limit the invention to any particular theory.

The molecular weight of the product can be readily controlled by adjustment of the feed rates and ratio of reactants. The greater the catalyst concentration the lower the molecular weights will be. The lower molecular weight stereoregular polypropylene glycols, e.g., those having a molecular weight in the approximate range of 200 to 5,000 are preferred since at the higher molecular weights the hydroxyl number of the product is decreased.

The isotactic polypropylene glycols prepared by the process and catalyst of this invention are crystalline-waxy as opposed to the liquid, atactic polypropylene glycol obtained when utilizing basic catalysts. These isotactic polypropylene glycols melt at elevated temperatures to a colorless, viscous liquid, and become crystalline after standing at room temperature.

The crystalline portion of the isotactic polypropylene glycol can be separated by precipitation in cold acetone and represents 11 to 14% by weight of the material. The molecular weight of the products can be readily controlled so as to fall within a range of from about several hundred to about 50,000. Preferably, the isotactic polypropylene glycols have a molecular weight of from about 200 to 5,000. Consequently, the described properties make these isotactic polypropylene glycols applicable for use in preparation of polyurethanes where special properties are needed. A polypropylene glycol is considered to be isotactic if it consists of chains which consist either entirely of l-propylene oxide units or entirely of d-propylene oxide units. A polypropylene glycol can also be described as isotactic if at least certain portions of appreciable lengths of the chains consist of the same stereo-configuration, i.e., either d-propylene oxide or l-propylene oxide:–llllllllllllllllddddddddddddddddd–.

The following examples will illustrate the preferred embodiments of the invention, but are not to be considered as being unduly limitative of the invention.

EXAMPLE 1

Preparation of aluminum triisopropoxide acetate

Ninety-four grams (0.796 mole) of propylene glycol monoacetate was placed in a reaction vessel equipped with a stirring device and an atmosphere of dry nitrogen. A solution of 52.5 grams (0.265 mole) of aluminum triisobutyl dissolved in 117 grams of benzene was slowly added to the propylene glycol monoacetate in the reaction vessel with the reaction taking place at room temperature. The by-product, isobutane, was removed in a Dry Ice trap. The catalyst component was soluble in benzene. For best results, the material should be used as soon as possible after preparation.

EXAMPLE 2

This example illustrates the preparation of the catalyst in situ. A 50 weight percent solution of benzene and aluminum triisobutyl (56 grams=0.283 mole) was prepared. A mixture of propylene glycol monoacetate (100 grams=0.848 mole), water (5.1 grams=0.283 mole) and d,l-propylene oxide (164 grams=2.83 moles) was prepared. The benzene-aluminum triisobutyl solution and propylene glycol monoacetate-water-propylene oxide mixture was added concurrently to 700 grams of benzene. The mole ratio of aluminum triisobutyl to propylene glycol monoacetate to water to propylene oxide was 1:3:1:10. This ratio was kept constant by adjustment of the feed rates throughout the experiment. The propylene oxide content was about 40 weight percent in the final reaction mixture.

The polymerization was performed in an open vessel equipped with a reflux condenser, thermometer and stirrer at temperatures from about 50° C. to 80° C. The mixture of propylene glycol monoacetate, water, and propylene oxide was added to the benzene-aluminum triisobutyl solution at such a rate that the polymerization took about 24 hours. After the polymerization reaction was complete, the aluminum was precipitated out of solution as aluminum hydroxide by stirring an excess of water (700 grams) into the reaction mixture. The product was then separated by extraction of the resulting slurry with benzene in a continuous extractor for about 16 hours. The hydroxyl-ester-terminated product (92 grams, saponification No. 361) was then saponified with an excess of 0.5 N·alcoholic potassium hydroxide (1,780 ml.), neutralized with dilute HCl, and extracted with benzene in a continuous extractor for about 16 hours to yield 61 grams of a colorless, viscous liquid. This liquid product crystallized on standing at room temperature to form a white semi-solid wax with an OH number of 234 corresponding to a molecular weight of 479. The difunctionality of the product was confirmed ebulliometrically by the molecular weight increase after the addition of a known amount of tolylene diisocyanate to form an NCO-terminated prepolymer.

EXAMPLE 3

This example illustrates the use of the catalyst system prepared in Example 1.

The aluminum triisopropoxide acetate in benzene solution as prepared in Example 1 was added concurrently with a mixture of 154 grams of commercial propylene oxide and 4.8 grams of water to 593 grams of benzene. The mole ratio of aluminum triisopropoxide acetate to water to propylene oxide was kept constant at 1:1:10 by adjustment of the feed rates throughout the experiment.

The polymerization was performed in an open vessel equipped with a reflux condenser, thermometer and stirrer at temperatures of from about 50 to 80° C. The catalyst solution and the propylene oxide-water mixture were added to the benzene at such a rate that the polymerization took about 24 hours. After the polymerization reaction was completed the aluminum was precipitated out of solution as aluminum hydroxide by stirring an excess of water (700 grams) into the reaction mixture. The polymer was separated by extraction of the resulting slurry with benzene in a continuous extractor for about 16 hours. The yield of 120 grams of the hydroxyl-ester-terminated product (saponification number 255) was then saponified by refluxing the material with 1640 ml. of 0.5 N·alcoholic potassium hydroxides. The solution was then neutralized with dilute HCl and extracted with about 500 ml. benzene in a continuous extractor for about 16 hours to yield 80 grams of a colorless viscous liquid. This liquid product crystallized on standing at room temperature to form a white semi-solid wax with a hydroxyl number of 205 corresponding to a molecular weight of 546. The molecular weight was determined ebulliometrically in benzene and found to be 530, confirming the difunctionality of the product.

A sample of the product was dissolved in acetone to form a 15% solution. This solution was kept at −21° C. for 24 hours. A white precipitate was formed and separated from the liquid by centrifugation. Residual acetone was removed by evaporation on a water bath at 60° C. in a vacuum for 5 hours. 12.3% of crystalline material was obtained.

EXAMPLE 4

This example illustrates the preparation of a higher molecular weight product with a lower catalyst concentration. Benzene in the amount of 2250 grams was charged into an open vessel equipped with a reflux condenser, stirrer, and themometer. A 50% benzene solution of 56 grams (0.283 mole) aluminum triisobutyl was prepared and fed into the reaction vessel. Concurrently, a mixture of 100 grams (0.848 mole) propylene glycol monoacetate, 5.1 grams (0.283 mole) water, and 1640 grams (28.3 mole) propylene oxide was fed into the reaction vessel. The feed rates were adjusted in such a manner as to maintain the mole ratio of aluminum triisobutyl to propylene glycol monoacetate to water to propylene oxide at 1:3:1:100 throughout the experiment. The reaction temperature was maintained between 50 and 80° C. A total feeding time of 24 hours was required. The aluminum was precipitated, and the hydroxyl-ester-terminated product was isolated by benzene extraction as previously described. Thirteen hundred and twenty grams of a white wax was recovered, exhibiting a saponification number of 15. This product was saponified, employing 0.5 N·alcoholic potassium hydroxide (50% excess), neutralized with dilute HCl and extracted with benzene to yield 1025 grams of a white wax, exhibiting a hydroxyl number of 26, which corresponds to a molecular weight of 4310, and an ebulliometrically determined molecular weight of 4100.

EXAMPLE 5

This example illustrates the processing of a low molecular weight isotactic polypropylene glycol to a polyurethane.

5.46 grams of isotactic polypropylene glycol, OH number of 205, as prepared in Example 3, is dissolved in 6 grams of dry toluene. 1.82 grams of a mixture of 2,4 and 2,6-toluene diisocyanate and a drop of dibutyltin dilaurate are added to the solution. The mixture is held at 90° C. for 3 hours. A film which is cast from this viscous solution is then oven-dried at 100° C. for 20 hours. The film is tougher and exhibits a higher tensile strength than a comparable film prepared from an atactic polypropylene glycol of similar molecular weight.

I claim:
1. A process of preparing isotactic polypropylene glycol from a d,1-mixture of propylene oxide comprising the steps of:
  (A) contacting said mixture with a catalytic amount of a catalyst consisting essentially of aluminum triisopropoxide acetate and water at a temperature of from about 50 to 80° C. and a pressure ranging from about atmospheric to about 20 atmospheres, thereby obtaining a reaction mixture containing a hydroxyl-ester-terminated polymer,
  (B) adding an excess of water to said reaction mixture, thereby precipitating aluminum as aluminum hydroxide,
  (C) separating the aluminum hydroxide from the reaction mixture, and
  (D) saponifying said hydroxyl-ester-terminated polymer with an alcohol solution of an alkali metal hydroxide.
2. A process of claim 1 wherein said aluminum triisopropoxide acetate is prepared by reacting aluminum triisobutyl and propylene glycol monoacetate and the mole ratio of aluminum triisobutyl to propylene glycol monoacetate to water to propylene oxide, is about 1:3 to 4:0.5 to 1.5:5 to 100, respectively.
3. A process of preparing isotactic polypropylene glycol having a molecular weight of from about 200 to 5000 for a d,1-mixture of propylene oxide comprising the steps of:
  (A) preparing a hydrocarbon solution of aluminum triisobutyl,
  (B) preparing a hydrocarbon solution of a mixture of propylene glycol monoacetate, water and d,1-propylene oxide,
  (C) adding said solutions simultaneously to a hydrocarbon solvent at a temperature of from about 50 to 80° C. and at a pressure from about atmospheric to about 20 atmospheres at a rate such that the propylene oxide polymerizes to a hydroxyl-ester-terminated polymer within a period of from about 12 to 55 hours.
  (D) adding water to said hydrocarbon solvent containing said polymer, thereby precipitating aluminum as aluminum hydroxide,
  (E) separating the aluminum hydroxide from the hydrocarbon solvent, and
  (F) saponifying the hydroxy-ester-terminated polymer with an alcoholic solution of an alkali metal hydroxide.
4. A process of claim 3 wherein the mole ratio of aluminum triisobutyl to propylene glycol monoacetate to water to propylene oxide is about 1:3 to 4:0.5 to 1.5:5 to 100, respectively.
5. A catalyst system for preparing stereoregular polymers from d,1-mixtures of propylene oxide comprising aluminum triisopropoxide acetate and water in a 1/1 molar ratio.

References Cited

UNITED STATES PATENTS 3,135,705  6/1964  Vandenberg.
3,219,591  11/1965  Vandenberg.
3,255,256  6/1966  Miller.
3,280,045  10/1966  Vandenberg _____ 260—12

FOREIGN PATENTS 785,053  10/1957  Great Britain.

LEON ZITVER, Primary Examiner

H. T. MARS, Assistant Examiner

U.S. Cl. X.R.

252—431; 260—448, 77.5, 496